United States Patent
Zhang et al.

(12)

(10) Patent No.: US 11,006,403 B2
(45) Date of Patent: May 11, 2021

(54) TECHNIQUES FOR USE IN DETERMINING A TRANSMISSION CONFIGURATION STATE

(71) Applicant: QUALCOMM Incorporated, San Diego, CA (US)

(72) Inventors: Xiaoxia Zhang, San Diego, CA (US); Jing Sun, San Diego, CA (US); Makesh Pravin John Wilson, San Diego, CA (US); Alexandros Manolakos, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/548,583

(22) Filed: Aug. 22, 2019

(65) Prior Publication Data

US 2020/0077369 A1 Mar. 5, 2020

Related U.S. Application Data

(60) Provisional application No. 62/726,846, filed on Sep. 4, 2018.

(51) Int. Cl.
*H04W 72/04* (2009.01)
*H04W 72/12* (2009.01)

(52) U.S. Cl.
CPC ....... *H04W 72/042* (2013.01); *H04W 72/048* (2013.01); *H04W 72/0446* (2013.01); *H04W 72/1268* (2013.01)

(58) Field of Classification Search
CPC .............. H04W 72/042; H04W 72/0446
See application file for complete search history.

(56) References Cited

U.S. PATENT DOCUMENTS

2017/0006525 A1* 1/2017 Ruiz Delgado ......... H04W 4/06
2018/0343653 A1* 11/2018 Guo ...................... H04L 5/0053
(Continued)

FOREIGN PATENT DOCUMENTS

WO WO-2018217063 A1 11/2018

OTHER PUBLICATIONS

3GPP Technical Specification Group Radio Access Network; NR; Physical layer procedures for data ,Jun. 29, 2018,V15.2.0, 29 ; pp. 1-95; year 2028.*

(Continued)

*Primary Examiner* — Fahmida S Chowdhury
(74) *Attorney, Agent, or Firm* — QUALCOMM Incorporated

(57) ABSTRACT

Aspects of the disclosure relate to determining a transmission configuration indication (TCI) state for receiving a multi-transmission point (TRP) communication. A receiving device receives a configuration message indicating a lowest control resource set identifier (CORESET ID) for receiving one or more downlink control information (DCI) and determines whether a state of the receiving device is within a scheduling threshold duration for decoding DCI. The receiving device then determines a TCI state for receiving data based on a TCI state associated with the lowest CORESET ID if the state of the receiving device is within the scheduling threshold duration, wherein the TCI state associated with the lowest CORESET ID indicates one or more sets of quasi co-location (QCL) parameters. The receiving device then receives the data from one or more transmission points (TRPs) based on the one or more sets of QCL parameters.

24 Claims, 8 Drawing Sheets

(56) References Cited

U.S. PATENT DOCUMENTS

2019/0297640 A1* 9/2019 Liou ................ H04W 72/1215
2020/0052844 A1* 2/2020 Yu ........................ H04L 5/0048

OTHER PUBLICATIONS

Source: vivo;Title: Remaining issues on simultaneous reception of DL/UL physical channels and RSs; Aug. 20-24, Agenda Item: 7.1.2.5; 2018,;p. 1-5; year 2018.*

"3rd Generation Partnership Project; Technical Specification Group Radio Access Network; NR; Physical layer procedures for Data (Release 15)", 3GPP Standard, Technical Specification, 3GPP TS 38.214, 3rd Generation Partnership Project (3GPP), Mobile Competence Centre, 650, Route Des Lucioles, F-06921 Sophia-Antipolis Cedex, France, vol. RAN WG1, No. V15.2.0, Jun. 29, 2018, XP051474491, pp. 1-95, [retrieved on Jun. 29, 2018], section 1 "Scope", section 5 .1. 2 .1 "Resource allocation in time domain" section 5 .1.2 .2 "Resource allocation in frequency domain" section 5.1.5 "Antenna ports quasi co-location", section 6.1.4, section 6.1.4.1, tables 6.1.4.1-1, 6.1.4.1-2.

International Search Report and Written Opinion—PCT/US2019/047869—ISA/EPO—dated Oct. 30, 2019.

Vivo: "Remaining Issues on Simultaneous Reception of DL/UL Physical Channels and RSs", 3GPP Draft, 3GPP TSG RAN WG1 Meeting #94, R1-1808223_Remaining Issues on Simultaneous Reception of DL/UL Physical Channels and RSs, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018 Aug. 10, 2018, XP051515608, 7 Pages, Retrieved from the Internet: URL:http://www.3gpp.org/ftp/tsg%5Fran/WG1%5FRL1/TSGR1%5F94/Docs/R1%2D1808223%2Ezip [retrieved on Aug. 10, 2018], p. 2, section 2.1.

ZTE: "Simultaneous Transmission and Reception of different Channels and Reference Signals", 3GPP Draft; R1-1808198 Simultaneous Tx and Rx of different Channels and Reference Signals, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; Aug. 20, 2018-Aug. 24, 2018 Aug. 11, 2018, XP051515583, Retrieved from the Internet: URL:http://www.3gpp.org/ftp/tsg%5Fran/WG1%5FRL1/TSGR1%5F94/Docs/R1%2D1808198%2Ezip [retrieved on Aug. 11, 2018], 6 pages.

* cited by examiner

TECHNIQUES FOR USE IN DETERMINING A TRANSMISSION CONFIGURATION STATE

PRIORITY CLAIM

This application claims priority to and the benefit of U.S. Provisional Patent Application No. 62/726,846 filed on Sep. 4, 2018, the entire content of which is incorporated herein by reference as if fully set forth below in its entirety and for all applicable purposes.

TECHNICAL FIELD

The technology discussed below relates generally to wireless communication systems, and more particularly, to a mechanism for use in determining a transmission configuration indication (TCI) state for receiving a multi-transmission point (TRP) communication.

INTRODUCTION

3rd Generation Partnership Project (3GPP) New Radio (NR) specifications (often referred to as 5G) support downlink transmissions from multiple transmission points (TRPs). In a multi-TRP transmission scheme, multiple TRPs may or may not be co-located (e.g., within a same cell). Moreover, the multiple TRPs may transmit data to the same UE. The data sent from the multiple TRPs to the same UE may be the same data or different data. When transmitting different data from the multiple TRPs, a higher throughput may be achieved. When transmitting the same data (with potentially different redundancy versions) from the multiple TRPs, transmission reliability may be improved.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to determining a transmission configuration indication (TCI) state for receiving a multi-transmission point (TRP) communication.

In one example, a method of wireless communication at a receiving device is disclosed. The method includes receiving a configuration message from a scheduling entity, the configuration message indicating at least a lowest control resource set identifier (CORESET ID) for receiving one or more downlink control information (DCI), determining whether a state of the receiving device is within a scheduling threshold duration for decoding DCI, determining a transmission configuration indication (TCI) state for receiving data based on a TCI state associated with the lowest CORESET ID if the state of the receiving device is within the scheduling threshold duration, wherein the TCI state associated with the lowest CORESET ID indicates one or more sets of quasi co-location (QCL) parameters, and receiving the data from one or more transmission points (TRPs) based on the one or more sets of QCL parameters.

In a further example, a receiving device for wireless communication is disclosed. The receiving device includes at least one processor, a transceiver communicatively coupled to the at least one processor, and a memory communicatively coupled to the at least one processor. The at least one processor is configured to receive a configuration message from a scheduling entity, the configuration message indicating at least a lowest control resource set identifier (CORESET ID) for receiving one or more downlink control information (DCI), determine whether a state of the receiving device is within a scheduling threshold duration for decoding DCI, determine a transmission configuration indication (TCI) state for receiving data based on a TCI state associated with the lowest CORESET ID if the state of the receiving device is within the scheduling threshold duration, wherein the TCI state associated with the lowest CORESET ID indicates one or more sets of quasi co-location (QCL) parameters, and receive the data from one or more transmission points (TRPs) based on the one or more sets of QCL parameters.

In one example, a method of wireless communication at a receiving device is disclosed. The method includes receiving a configuration message from a scheduling entity, the configuration message configuring an initial transmission configuration indication (TCI) state indicating one or more sets of quasi co-location (QCL) parameters for receiving data, determining whether a state of the receiving device is within a scheduling threshold duration for decoding DCI, determining a TCI state to be the initial TCI state if the state of the receiving device is within the scheduling threshold duration, and receiving the data from one or more transmission points (TRPs) based on the one or more sets of QCL parameters indicated by the initial TCI state.

In a further example, a receiving device for wireless communication is disclosed. The receiving device includes at least one processor, a transceiver communicatively coupled to the at least one processor, and a memory communicatively coupled to the at least one processor. The at least one processor is configured to receive a configuration message from a scheduling entity, the configuration message configuring an initial transmission configuration indication (TCI) state indicating one or more sets of quasi co-location (QCL) parameters for receiving data, determine whether a state of the receiving device is within a scheduling threshold duration for decoding DCI, determine a TCI state to be the initial TCI state if the state of the receiving device is within the scheduling threshold duration, and receive the data from one or more transmission points (TRPs) based on the one or more sets of QCL parameters indicated by the initial TCI state.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the disclosure relate to determining a transmission configuration indication (TCI) state for receiving a multi-transmission point (TRP) communication.

Figure 1:
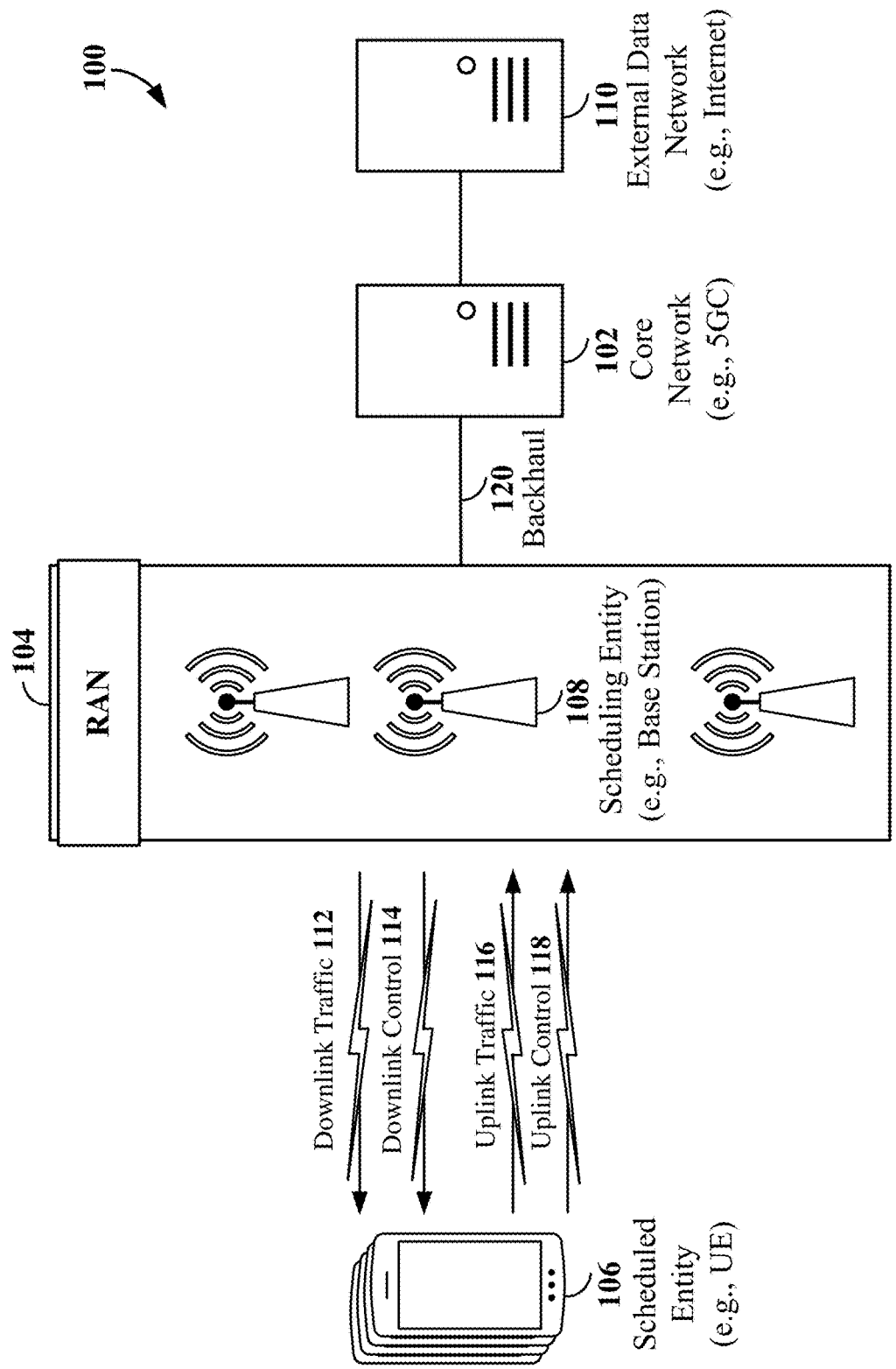
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
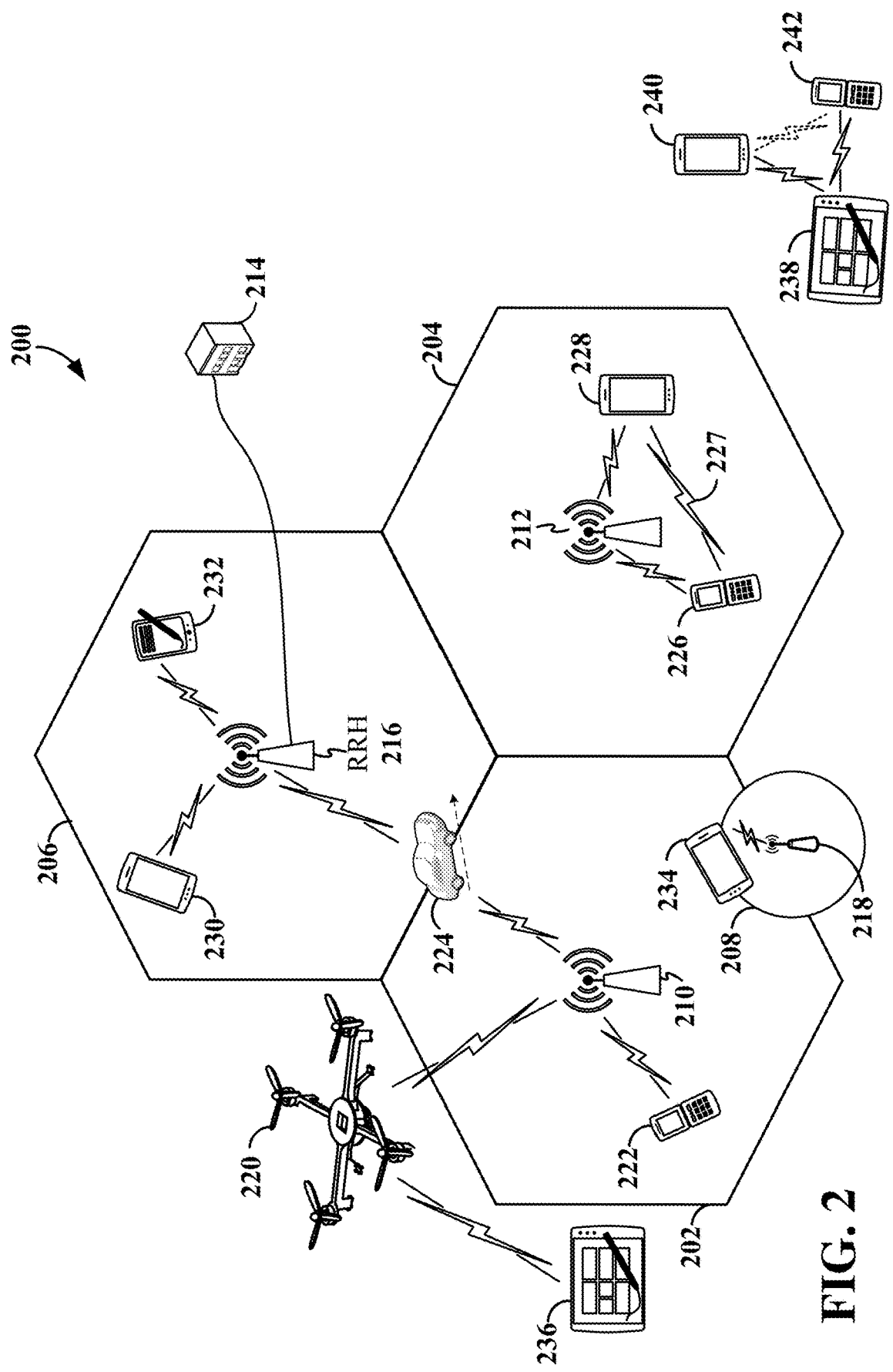
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
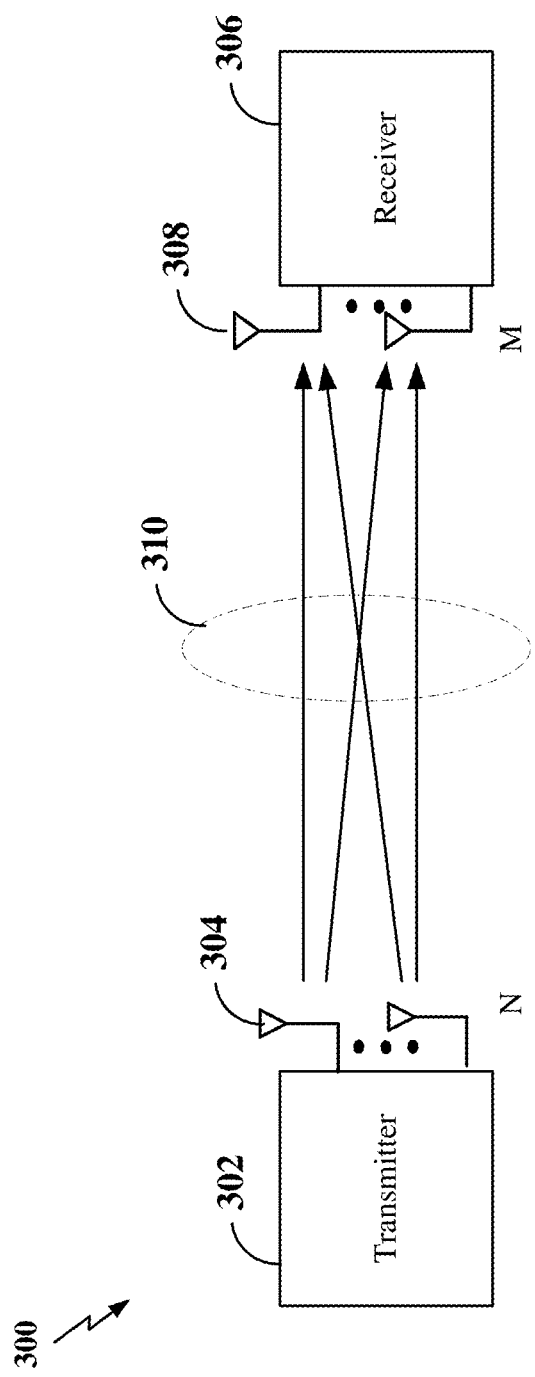
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
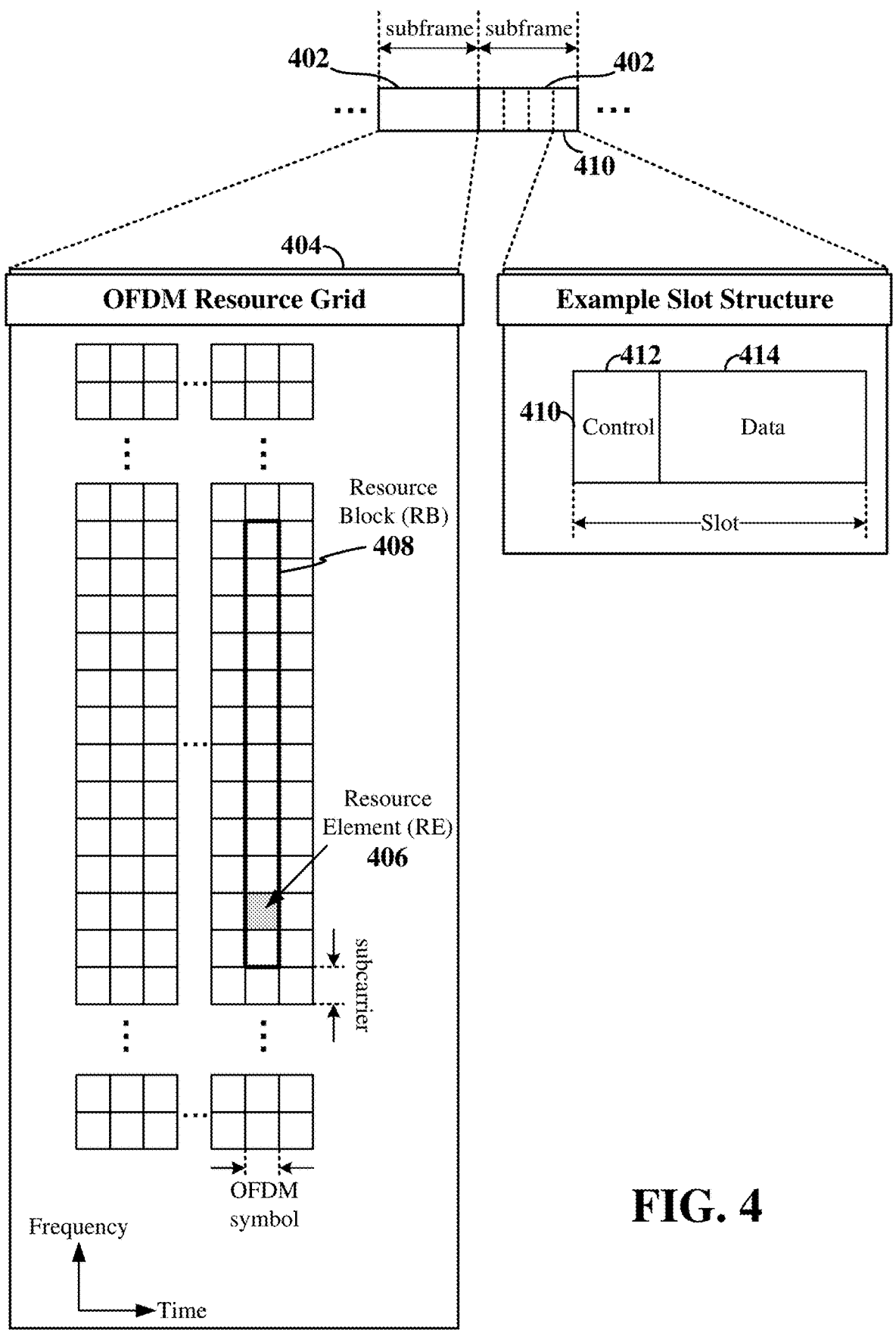
FIG. 4 is a schematic illustration of an organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 406 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

5G NR multi-transmission point (TRP) transmission improves transmission reliability and robustness. For example, if two TRPs serve the same UE and one TRP becomes blocked, the other TRP can still serve the UE. 5G NR multi-TRP transmission also improves transmission capacity. For example, if a UE is at the edge of two TRPs, both TRPs may serve the UE at the same time instead of causing interference, and consequently, enable better throughput.

In an aspect, 5G NR multi-TRP transmission in the downlink may support two modes. In a first mode, a single downlink control information (DCI) transmission (single PDCCH) grants a single transport block (TB) to a device (e.g., UE), where different spatial layers in a scheduled TB are transmitted from two or more TRPs (e.g., base stations). For example, the UE may receive one PDCCH granting two spatial layers, wherein one spatial layer is transmitted from one TRP and another spatial layer is transmitted from another TRP. In a second mode, multiple DCI transmissions are possible, where each DCI transmission grants one TB to the device, and each scheduled TB is transmitted from one TRP.

With regard to the second mode, a number of scenarios may occur. For example, multiple DCI transmissions may be transmitted from the same TRP or different TRPs. In another example, multiple TBs associated with the multiple DCI transmissions may correspond to a different payload or a same payload with a potentially different redundancy version index (RVID).

In an aspect of the disclosure, TBs may be communicated according to a joint multi-TRP transmission scheme to improve transmission diversity. In the multi-TRP transmission scheme, multiple TRPs may or may not be co-located (e.g., within a same cell). Moreover, the multiple TRPs may transmit data to the same UE. The data sent from the multiple TRPs to the same UE may be the same data or different data. In the case of different data being transmitted from the multiple TRPs, the goal of the scheme may be to achieve higher throughput. In the case of the same data (with potentially different RVID) being transmitted from the multiple TRPs, the goal of the scheme may be to improve transmission reliability.

Figure 5:
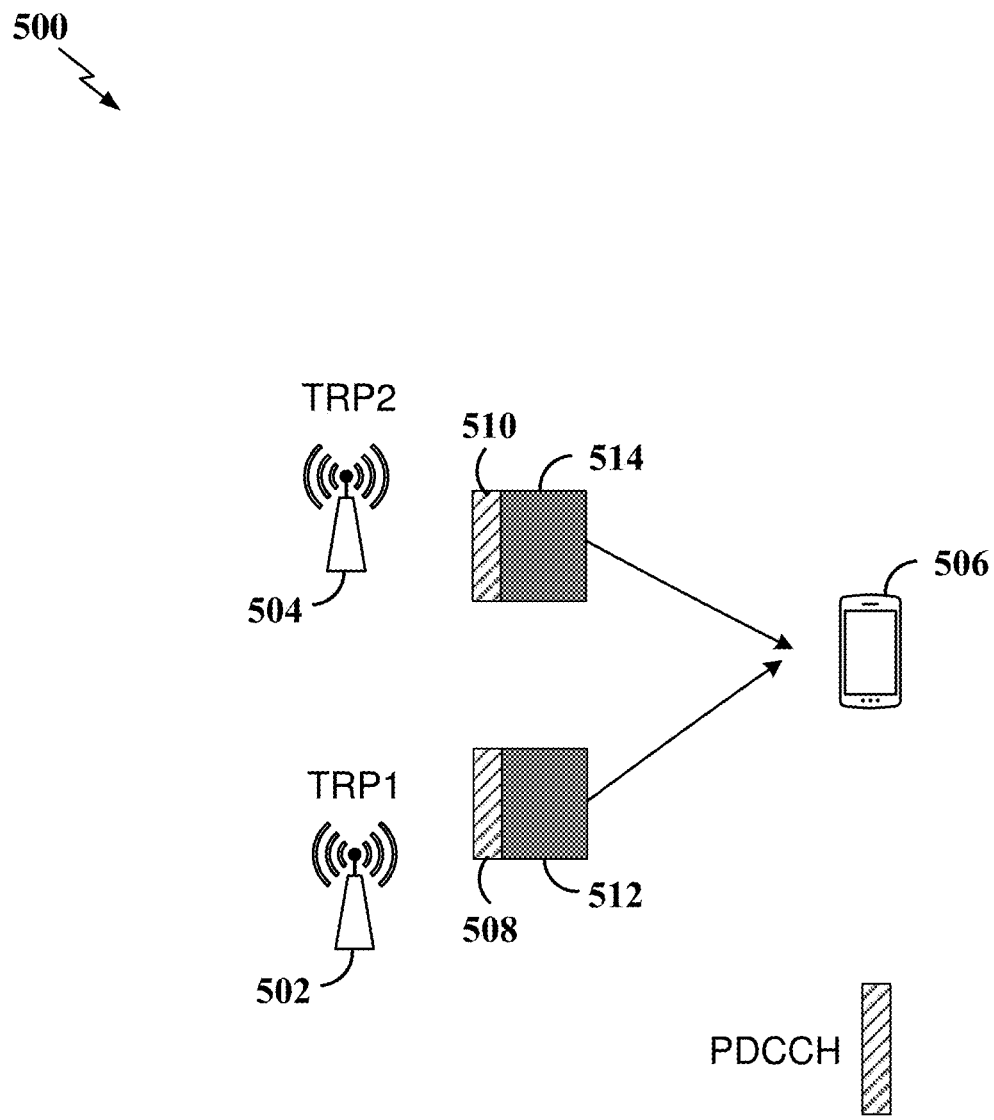
FIG. 5 is a diagram illustrating multi-TRP transport block (TB) transmission.

FIG. 5 is a diagram 500 illustrating multi-TRP transport block (TB) transmission. As shown, a first TRP (e.g., base station) 502 transmits a first PDCCH 508 granting a first TB 512 to a UE 506. Also, a second TRP 504 transmits a second PDCCH 510 granting a second TB 514 to the UE 506. The first TB 512 and the second TB 514 may carry the same payload or different payloads.

In an aspect, 5G NR multi-TRP supports quasi co-location (QCL) indication of demodulation reference signals (DM-RS) for PDSCH via DCI signaling. Two antenna ports may be defined as quasi co-located if properties of a channel over which a symbol on one antenna port is conveyed can be inferred from a channel over which a symbol on the other antenna port is conveyed. Accordingly, if two antenna ports are quasi co-located, then large scale statistics can be shared between the two antenna ports. For example, if two antenna ports are quasi co-located with spatial reception (spatial Rx), which is a QCL type, then a UE may use a Rx beam corresponding to a first signal (e.g., signal A) to receive a second signal (e.g., signal B). In more detail, if PDSCH is quasi co-located with a synchronization signal block (SSB) index 0 in terms of spatial Rx, then a UE may use a beam corresponding to the SSB index 0 to receive the PDSCH.

A transmission configuration indication (TCI) state indicates (over DCI) a transmission configuration between reference signals of a reference signal (RS) set and corresponding DM-RS ports. DM-RS ports that are quasi co-located are within one DM-RS group. DM-RS ports in different groups are not quasi co-located. A N-bit TCI field in the DCI may be extended to support QCL indication of DM-RS for PDSCH. For example, each TCI state may refer to one or two RS sets, which indicates a QCL relationship for one or two DMRS port group(s), respectively. For a single TRP, the TCI state may indicate QCL to a UE. For example, the TCI state may indicate to the UE that a Rx beam normally used to receive a first signal (e.g., signal A) may also be used to receive a second signal (e.g., signal B). In another example, the TCI state may indicate to the UE that a delay spread or frequency error estimated for another RS may also be used to demodulate PDSCH.

In an aspect, each RS set may refer to one or more RSs, which are quasi co-located with DM-RS ports within a corresponding DM-RS group. Notably, the RSs within a RS set may be of different types. RS types may include DM-RS, SSB, phase tracking reference signal (PT-RS), and channel state information reference signal (CSI-RS), for example. If there is more than one RS type per RS set, each RS type may be associated with different QCL parameters. For example, one RS type may be associated with spatial QCL while another RS type may be associated with other QCL parameters, etc. Configuration of a RS set for each state may be performed via higher layer signaling, e.g., a radio resource control (RRC) configuration message or a RRC configuration message with a medium access control layer control element (MAC CE). Aspects of the disclosure may also relate to a timing of when the QCL is applied relative to a time of the QCL indication.

In an aspect, a RRC configuration message configures a UE with a list of up to M candidate transmission configuration indication (TCI) states at least for the purposes of QCL indication. Between initial RRC configuration and MAC CE activation of TCI states, the UE may assume that both PDCCH and PDSCH DM-RS are spatially quasi co-located with the synchronization signal block (SSB) determined during initial access.

For a case when at least spatial QCL is configured/indicated via the RRC configuration message, a higher layer UE-specific configuration based on whether or not a TCI field is present in downlink-related DCI may be supported. In an aspect, when the TCI field is not present in the downlink-related DCI, no dynamic indication of QCL parameters for PDSCH is provided. To receive PDSCH, the UE may apply higher layer signaling of QCL parameters/indication for determining the QCL parameters.

In another aspect, the TCI field is present in the associated DCI for PDSCH scheduling irrespective of same-slot scheduling or cross-slot scheduling. A scheduling offset may refer to a period between a slot carrying a PDCCH with the associated DCI and a slot carrying the PDSCH scheduled by the PDCCH. A threshold (e.g., k slots) may refer to a time needed by a UE to process PDCCH and prepare for PDSCH reception based on the PDCCH signaling. For example, a base station (or gNB) may configure a TCI field in a DCI carried via PDCCH. Typically, when the UE decodes the PDCCH, the UE can determine the TCI state based on the TCI field in order to receive PDSCH. However, the UE may need time to decode the PDCCH, read the PDCCH content, determine the TCI state based on the TCI field, and configure the TCI state for PDSCH reception. The time needed by the UE to perform these operations may be referred to as the threshold. The threshold may be based on UE capability if multiple candidate values of k are supported. Accordingly, if the TCI field is present in the associated DCI, the UE may use QCL parameters indicated by the TCI field in the associated DCI if the scheduling offset is greater than or equal to the threshold.

However, if the TCI field is present in the associated DCI and if the scheduling offset is less than the threshold (e.g., k slots), the UE cannot effectively use the QCL parameters indicated by the TCI field since the UE will have no time to decode/read the PDCCH and determine the TCI state based on the TCI field for PDSCH reception. As such, the UE may use QCL parameters that are based on a first or initial TCI state to receive the PDSCH. For example, the first or initial TCI state may be the TCI state used for control channel QCL indication for a lowest control resource set (CORESET) ID in a corresponding slot. In certain instances, the first or initial TCI state may be referred to as a default TCI state. In an aspect, the UE may be configured with multiple CORESETs for PDCCH monitoring, wherein different CORESETs may have different TCI states/configurations (different QCL parameters). Therefore, when the scheduling offset is less than the threshold, the UE may use the TCI state/configuration corresponding to the lowest CORESET ID for PDSCH reception (e.g., lowest CORESET ID configured by higher layer parameters). As noted above, if the scheduling offset is greater than or equal to the threshold, the UE may use the TCI state indicated in the associated DCI of a received PDCCH to receive a corresponding PDSCH. For example, the UE may use a beam (spatial QCL parameter) indicated by the N-bit TCI field in the associated DCI. In a 5G NR FR2 frequency range (e.g., mm-wave frequencies), the QCL indicated by the TCI state may also determine the spatial Rx parameter for UE reception.

Aspects of the present disclosure relate to extending a 5G NR design for single-TRP transmission to multi-TRP transmission. In particular, an initial TCI state (or default TCI state) for PDSCH reception when the scheduling offset is less than the threshold is determined for multi-TRP transmission.

The TCI state for a PDCCH CORESET may include one QCL relationship or multiple QCL relationships. That is, multiple QCL relationships may be provided, even for control information. In this way, the UE is able to detect PDCCH from a single TRP or multiple TRPs (e.g., either TRP or both TRPs in an example two-TRP transmission scheme). Depending on the TCI state configuration for the lowest CORESET ID, the UE may be able to receive data (PDSCH) from a single TRP or multiple TRPs. In an aspect, because the UE may only have a single DM-RS port for PDCCH, when the PDCCH CORESET includes multiple QCL relationships, different time or frequency resources may use different QCL relationships. For example, the CORESET may have two symbol durations where each symbol duration corresponds to a separate QCL relationship. Alternatively, the CORESET may be divided into two frequency regions where each frequency region corresponds to a separate QCL relationship.

In an aspect, a scheduling entity (e.g., base station or gNB) may explicitly configure the default TCI state for a UE to receive PDSCH during a scheduling offset period (e.g., when the scheduling offset is less than the threshold). The default TCI state may not be the same as a TCI state for PDCCH reception. For example, the scheduling entity may configure TCI for PDCCH corresponding to a single TRP while the TCI for data (PDSCH) may correspond to multiple TRPs. This is especially useful when a single PDCCH is used to schedule data from multiple TRPs. When the default TCI state for PDSCH is not explicitly configured by the scheduling entity, the UE may derive the default TCI state as described above. That is, if the base station or gNB does not configure the default TCI state for PDSCH, the UE may link the default TCI state to the lowest CORESET ID.

In an aspect, the scheduling threshold may be different from a previous 5G NR threshold, such as when the UE needs to monitor multiple DCIs from multiple TRPs, and therefore, the duration of the threshold may need to be larger to give the UE more time to monitor more PDCCHs/TRPs. For the PDCCH CORESET configuration, in addition to TCI, the scheduling entity may also indicate a number of PDCCHs to monitor and/or a corresponding scheduling threshold (e.g., k slots). For example, some TCI states only correspond to a single TRP and the UE may only need to monitor one PDCCH for downlink unicast PDSCH reception. Accordingly, the scheduling threshold may be similar to a threshold for a single TRP case. In another example, some TCI states allow the UE to monitor PDCCH from multiple TRPs for downlink unicast PDSCH reception. Accordingly, the scheduling threshold may be larger than the threshold for the single TRP case.

Figure 6:
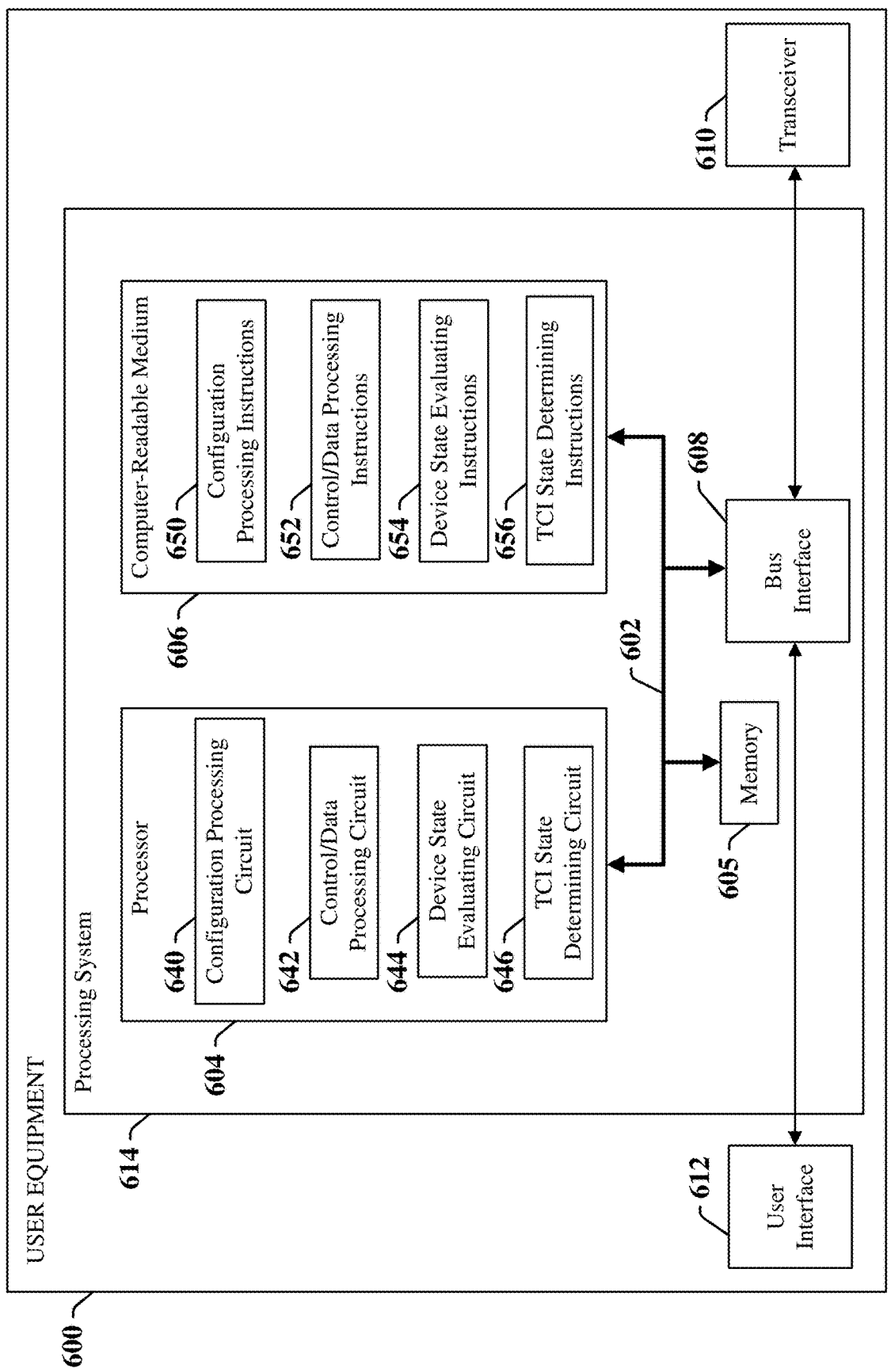
FIG. 6 is a block diagram illustrating an example of a hardware implementation for a user equipment according to some aspects of the present disclosure.

FIG. 6 is a block diagram illustrating an example of a hardware implementation for a user equipment (UE) 600 employing a processing system 614. For example, the UE 600 may be a UE as illustrated in any one or more of FIGS. 1 and/or 2.

The UE 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 600 may be configured to perform any one or more of the functions described herein. That is, the processor 604, as utilized in a UE 600, may be used to implement any one or more of the processes and procedures described below and illustrated in FIGS. 7 and 8.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a communication interface or means for communicating with various other apparatus over a transmission medium. Depending upon the nature of the apparatus, a user interface 612 (e.g., keypad, display, speaker, microphone, joystick) may also be provided. Of course, such a user interface 612 is optional, and may be omitted in some examples, such as a base station.

In some aspects of the disclosure, the processor 604 may include configuration processing circuitry 640 configured for various functions, including, for example, receiving a configuration message from a scheduling entity. For example, the configuration processing circuitry 640 may be configured to implement one or more of the functions described below in relation to FIG. 7, including, e.g., block 702 and in relation to FIG. 8, including e.g., block 802. The processor 604 may also include control/data processing circuitry 642 configured for various functions, including, for example, monitoring one or more control channels, receiving one or more downlink control information (DCI), and receiving data. For example, the control/data processing circuitry 642 may be configured to implement one or more of the functions described below in relation to FIG. 7, including, e.g., blocks 704, 706, and 714 and in relation to FIG. 8, including, e.g., blocks 804, 806, 812, and 816. The processor 604 may also include device state evaluating circuitry 644 configured for various functions, including, for example, detecting whether a state of a receiving device is within a scheduling threshold duration and detecting whether a scheduling offset period is less than, greater than, or equal to, the scheduling threshold duration. For example, the device state evaluating circuitry 644 may be configured to implement one or more of the functions described below in relation to FIG. 7, including, e.g., blocks 708 and 712 and in relation to FIG. 8, including, e.g., blocks 808 and 814. The processor 604 may also include TCI state determining circuitry 646 configured for various functions, including, for example, determining a transmission configuration indication (TCI) state. For example, the TCI state determining circuitry 646 may be configured to implement one or more of the functions described below in relation to FIG. 7, including, e.g., blocks 710 and 712 and in relation to FIG. 8, including, e.g., blocks 810 and 814.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 606 may include the configuration processing instructions 650 configured for various functions, including, for example, receiving a configuration message from a scheduling entity. The configuration processing instructions 650 may be configured to implement one or more of the functions described below in relation to FIG. 7, including, e.g., block 702 and in relation to FIG. 8, including e.g., block 802. The computer-readable storage medium 606 may also include control/data processing instructions 652 configured for various functions, including, for example, monitoring one or more control channels, receiving one or more downlink control information (DCI), and receiving data. For example, the control/data processing instructions 652 may be configured to implement one or more of the functions described below in relation to FIG. 7, including, e.g., blocks 704, 706, and 714 and in relation to FIG. 8, including, e.g., blocks 804, 806, 812, and 816. The computer-readable storage medium 606 may also include device state evaluating instructions 654 configured for various functions, including, for example, detecting whether a state of a receiving device is within a scheduling threshold duration for decoding DCI and detecting whether a scheduling offset period is less than, greater than, or equal to, the scheduling threshold duration. For example, the device state evaluating instructions 654 may be configured to implement one or more of the functions described below in relation to FIG. 7, including, e.g., blocks 708 and 712 and in relation to FIG. 8, including, e.g., blocks 808 and 814. The computer-readable storage medium 606 may also include TCI state determining instructions 656 configured for various functions, including, for example, determining a transmission configuration indication (TCI) state. For example, the TCI state determining instructions 656 may be configured to implement one or more of the functions described below in relation to FIG. 7, including, e.g., blocks 710 and 712 and in relation to FIG. 8, including, e.g., blocks 810 and 814.

Figure 7:
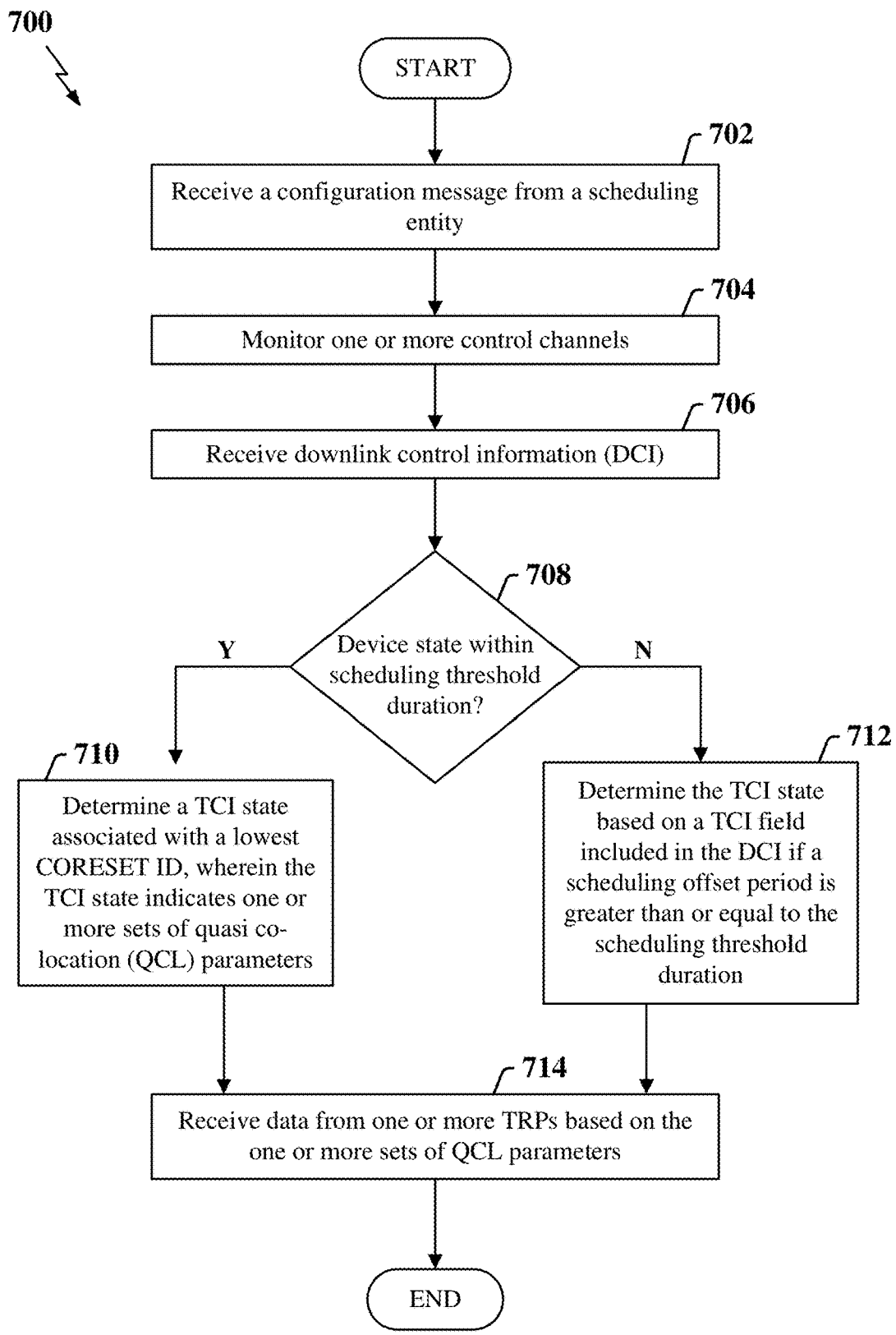
FIG. 7 is a flow chart illustrating an exemplary process for determining a transmission configuration indication (TCI) state for receiving a multi-transmission point (TRP) communication at a receiving device in accordance with some aspects of the present disclosure.

FIG. 7 is a flow chart illustrating an exemplary process 700 for determining a transmission configuration indication (TCI) state for receiving a multi-transmission point (TRP) communication at a receiving device in accordance with some aspects of the present disclosure. As described below, some or all illustrated features may be omitted in a particular implementation within the scope of the present disclosure, and some illustrated features may not be required for implementation of all embodiments. In some examples, the process 700 may be carried out by the UE 600 illustrated in FIG. 6. In some examples, the process 700 may be carried out by any suitable apparatus or means for carrying out the functions or algorithm described below.

At block 702, the receiving device may receive a configuration message from a scheduling entity (e.g., base station 108) indicating at least a lowest control resource set identifier (CORESET ID) for receiving one or more downlink control information (DCI). The lowest CORESET ID is associated with a transmission configuration indication (TCI) indicating one or more sets of quasi co-location (QCL) parameters for receiving the one or more DCI. The configuration message may further indicate a number of control channels (e.g., PDCCHs) to monitor. Accordingly, at block 704, the receiving device may monitor the number of control channels to receive the one or more DCI from one or more transmission points (TRPs).

At block 706, the receiving device may receive the one or more DCI from the one or more TRPs based on the one or more sets of QCL parameters. In an aspect, each set of QCL parameters in the one or more QCL parameters for receiving the one or more DCI may correspond to a respective symbol in a set of symbols associated with the lowest CORESET ID or may correspond to a respective frequency region in a set of frequency regions associated with the lowest CORESET ID.

At block 708, the receiving device may detect whether a state of the receiving device is within a scheduling threshold duration (e.g., k slots) for decoding DCI. In an aspect, the configuration message further indicates the scheduling threshold duration.

At block 710, if the state of the receiving device is within the scheduling threshold duration, the receiving device may determine a TCI state for receiving data based on the TCI state associated with the lowest CORESET ID. That is, the TCI state indicating the one or more sets of QCL parameters for receiving the one or more DCI is determined to be the TCI state for receiving the data (e.g., PDSCH). Thereafter, at block 714, the receiving device may receive the data from the one or more TRPs based on the one or more sets of QCL parameters.

Alternatively, at block 712, if the state of the receiving device is not within the scheduling threshold duration, the receiving device detects whether a scheduling offset period (indicated in a received DCI) is greater than or equal to the scheduling threshold duration. If the scheduling offset period is greater than or equal to the scheduling threshold duration, the receiving device may determine the TCI state for receiving the data based on a TCI field included in the DCI. As such, the TCI field indicates the one or more sets of QCL parameters for receiving the data. The receiving device may then receive (at block 714) the data from one or more transmission points (TRPs) based on the one or more sets of QCL parameters.

In one configuration, the apparatus 600 for wireless communication includes means for receiving a configuration message from a scheduling entity, the configuration message indicating at least a lowest control resource set identifier (CORESET ID) for receiving one or more downlink control information (DCI), means for receiving downlink control information (DCI), means for determining whether a state of a receiving device is within a scheduling threshold duration for decoding DCI, means for determining a transmission configuration indication (TCI) state for receiving data based on a TCI state associated with the lowest CORESET ID if the state of the receiving device is within the scheduling threshold duration, wherein the TCI state associated with the lowest CORESET ID indicates one or more sets of quasi co-location (QCL) parameters, means for receiving a DCI of the one or more DCI, the DCI including a scheduling offset period, means for detecting whether the scheduling offset period is greater than or equal to the scheduling threshold duration if the state of the receiving device is not within the scheduling threshold duration, means for determining the TCI state based on a TCI field included in the DCI if the scheduling offset period is greater than or equal to the scheduling threshold duration, wherein the TCI field indicates the one or more sets of QCL parameters for receiving the data, means for receiving the data from one or more transmission points (TRPs) based on the one or more sets of QCL parameters, means for receiving the one or more DCI from the one or more TRPs based on the one or more sets of QCL parameters, and means for monitoring the number of control channels to receive the one or more DCI from the one or more TRPs. In one aspect, the aforementioned means may be the processor 604 shown in FIG. 6 configured to perform the functions recited by the aforementioned means. In another aspect, the aforementioned means may be a circuit or any apparatus configured to perform the functions recited by the aforementioned means.

Of course, in the above examples, the circuitry included in the processor 604 is merely provided as an example, and other means for carrying out the described functions may be included within various aspects of the present disclosure, including but not limited to the instructions stored in the computer-readable storage medium 606, or any other suitable apparatus or means described in any one of the FIGS. 1 and/or 2, and utilizing, for example, the processes and/or algorithms described herein in relation to FIG. 7.

Figure 8:
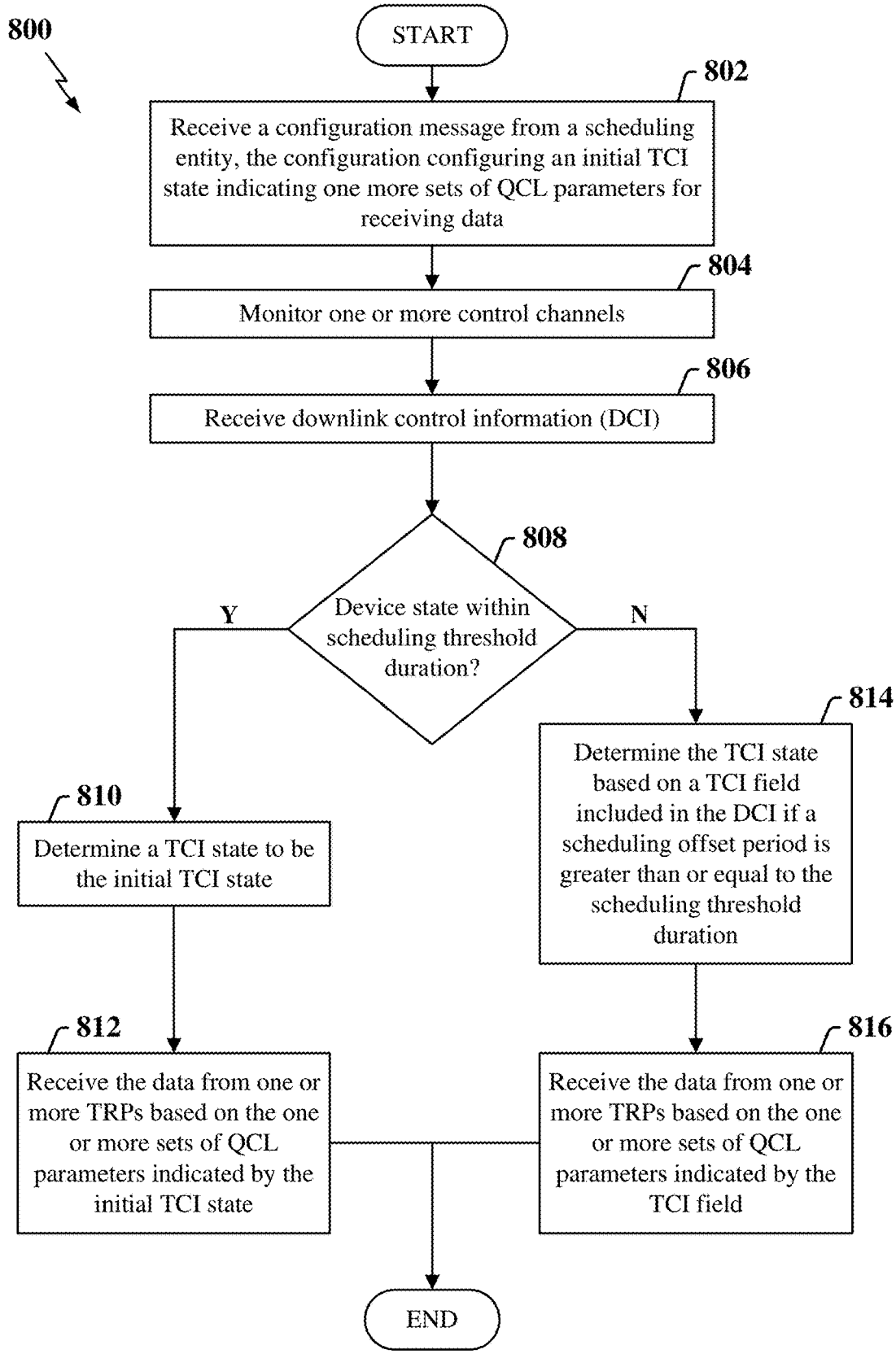
FIG. 8 is a flow chart illustrating another exemplary process for determining a transmission configuration indication (TCI) state for receiving a multi-transmission point (TRP) communication at a receiving device in accordance with some aspects of the present disclosure.

FIG. 8 is a flow chart illustrating an exemplary process 800 for determining a transmission configuration indication (TCI) state for receiving a multi-transmission point (TRP) communication at a receiving device in accordance with some aspects of the present disclosure. As described below, some or all illustrated features may be omitted in a particular implementation within the scope of the present disclosure, and some illustrated features may not be required for implementation of all embodiments. In some examples, the process 800 may be carried out by the UE 600 illustrated in FIG. 6. In some examples, the process 800 may be carried out by any suitable apparatus or means for carrying out the functions or algorithm described below.

At block 802, the receiving device may receive a configuration message from a scheduling entity (e.g., base station 108). The configuration message may configure an initial (or default) transmission configuration indication (TCI) state indicating one or more sets of quasi co-location (QCL) parameters for receiving data (e.g., PDSCH).

In an aspect, the configuration message may further indicate a number of control channels (e.g., PDCCHs) to monitor. Accordingly, at block 804, the receiving device may monitor the number of control channels to receive one or more downlink control information (DCI) from one or more transmission points (e.g., TRPs).

At block 806, the receiving device may receive the one or more DCI. At block 808, the receiving device detects whether a state of the receiving device is within a scheduling threshold duration (e.g., k slots) for decoding DCI. In an aspect, the configuration message further indicates the scheduling threshold duration.

At block 810, if the state of the receiving device is within the scheduling threshold duration, the receiving device may determine a TCI state to be the initial TCI state. Accordingly, at block 812, the receiving device may receive the data from the one or more TRPs based on the one or more sets of QCL parameters indicated by the initial TCI state.

Alternatively, at block 814, if the state of the receiving device is not within the scheduling threshold duration, the receiving device detects whether a scheduling offset period (indicated in a received DCI) is greater than or equal to the scheduling threshold duration. If the scheduling offset period is greater than or equal to the scheduling threshold duration, the receiving device may determine the TCI state based on a TCI field included in the DCI, wherein the TCI field indicates one or more sets of QCL parameters for receiving the data. Accordingly, at block 816, the receiving device may receive the data from the one or more transmission points (TRPs) based on the one or more sets of QCL parameters indicated by the TCI field.

In an aspect, the configuration message further configures a second transmission configuration indication (TCI) state indicating one or more sets of QCL parameters for receiving the one or more DCI. The one or more sets of QCL parameters for receiving the data indicated by the initial TCI state may be different from the one or more sets of QCL parameters for receiving the one or more DCI indicated by the second TCI state. Accordingly, at block 806, the receiving device may receive the one or more DCI from the one or more TRPs based on the second TCI state.

In one configuration, the apparatus 600 for wireless communication includes means for receiving a configuration message from a scheduling entity, the configuration message configuring an initial transmission configuration indication (TCI) state indicating one or more sets of quasi co-location (QCL) parameters for receiving data, means for receiving one or more downlink control information (DCI), wherein a DCI includes a scheduling offset period, means for determining whether a state of a receiving device is within a scheduling threshold duration for decoding DCI, means for determining a TCI state to be the initial TCI state if the state of the receiving device is within the scheduling threshold duration, and means for receiving the data from one or more transmission points (TRPs) based on the one or more sets of QCL parameters indicated by the initial TCI state, if the state of the receiving device is not within the scheduling threshold duration: means for determining whether the scheduling offset period is greater than or equal to the scheduling threshold duration, means for determining the TCI state based on a TCI field included in the DCI if the scheduling offset period is greater than or equal to the scheduling threshold duration, wherein the TCI field indicates one or more sets of QCL parameters for receiving the data, and means for receiving the data from the one or more transmission points (TRPs) based on the one or more sets of QCL parameters indicated by the TCI field, and wherein the configuration message further indicates a number of control channels to monitor, means for monitoring the number of control channels to receive the one or more DCI from the one or more TRPs. In one aspect, the aforementioned means may be the processor 604 shown in FIG. 6 configured to perform the functions recited by the aforementioned means. In another aspect, the aforementioned means may be a circuit or any apparatus configured to perform the functions recited by the aforementioned means.

Of course, in the above examples, the circuitry included in the processor 604 is merely provided as an example, and other means for carrying out the described functions may be included within various aspects of the present disclosure, including but not limited to the instructions stored in the computer-readable storage medium 606, or any other suitable apparatus or means described in any one of the FIGS. 1 and/or 2, and utilizing, for example, the processes and/or algorithms described herein in relation to FIG. 8.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-8 may be rearranged and/or combined into a single component, step, feature or function or embodied in several components, steps, or functions.

Additional elements, components, steps, and/or functions may also be added without departing from novel features disclosed herein. The apparatus, devices, and/or components illustrated in FIGS. 1-8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a receiving device, comprising:
    receiving a configuration message from a scheduling entity, the configuration message indicating at least a lowest control resource set identifier (CORESET ID) for receiving one or more downlink control information (DCI);
    determining whether a state of the receiving device is within a scheduling threshold duration for decoding DCI;
    determining a transmission configuration indication (TCI) state for receiving data based on a TCI state associated with the lowest CORESET ID if the state of the receiving device is within the scheduling threshold duration, wherein the TCI state associated with the lowest CORESET ID indicates one or more sets of quasi co-location (QCL) parameters; and
    receiving the data from one or more transmission points (TRPs) based on the one or more sets of QCL parameters.

2. The method of claim 1, further comprising receiving a DCI of the one or more DCI, the DCI including a scheduling offset period.

3. The method of claim 2, wherein if the state of the receiving device is not within the scheduling threshold duration, the method further comprising:
    determining whether the scheduling offset period is greater than or equal to the scheduling threshold duration; and
    determining the TCI state based on a TCI field included in the DCI if the scheduling offset period is greater than or equal to the scheduling threshold duration, wherein the TCI field indicates the one or more sets of QCL parameters for receiving the data.

4. The method of claim 1, further comprising:
    receiving the one or more DCI from the one or more TRPs based on the one or more sets of QCL parameters.

5. The method of claim 4, wherein each set of QCL parameters in the one or more sets of QCL parameters for receiving the one or more DCI corresponds to:
    a respective symbol in a set of symbols associated with the lowest CORESET ID; or
    a respective frequency region in a set of frequency regions associated with the lowest CORESET ID.

6. The method of claim 1, wherein the configuration message further indicates a number of control channels to monitor, the method further comprising:
    monitoring the number of control channels to receive the one or more DCI from the one or more TRPs.

7. The method of claim 1, wherein the configuration message further indicates the scheduling threshold duration.

8. A receiving device for wireless communication, comprising:
    at least one processor;
    a transceiver communicatively coupled to the at least one processor; and
    a memory communicatively coupled to the at least one processor, wherein the at least one processor is configured to:
        receive a configuration message from a scheduling entity, the configuration message indicating at least a lowest control resource set identifier (CORESET ID) for receiving one or more downlink control information (DCI),
        determine whether a state of the receiving device is within a scheduling threshold duration for decoding DCI,
        determine a transmission configuration indication (TCI) state for receiving data based on a TCI state associated with the lowest CORESET ID if the state of the receiving device is within the scheduling threshold duration, wherein the TCI state associated with the lowest CORESET ID indicates one or more sets of quasi co-location (QCL) parameters, and
        receive the data from one or more transmission points (TRPs) based on the one or more sets of QCL parameters.

9. The receiving device of claim 8, wherein the at least one processor is further configured to receive a DCI of the one or more DCI, the DCI including a scheduling offset period.

10. The receiving device of claim 9, wherein if the state of the receiving device is not within the scheduling threshold duration, the at least one processor is configured to:
    determine whether the scheduling offset period is greater than or equal to the scheduling threshold duration; and
    determine the TCI state based on a TCI field included in the DCI if the scheduling offset period is greater than or equal to the scheduling threshold duration, wherein the TCI field indicates the one or more sets of QCL parameters for receiving the data.

11. The receiving device of claim 8, wherein the at least one processor is further configured to:
receive the one or more DCI from the one or more TRPs based on the one or more sets of QCL parameters.

12. The receiving device of claim 11, wherein each set of QCL parameters in the one or more sets of QCL parameters for receiving the one or more DCI corresponds to:
a respective symbol in a set of symbols associated with the lowest CORESET ID; or
a respective frequency region in a set of frequency regions associated with the lowest CORESET ID.

13. The receiving device of claim 8, wherein the configuration message further indicates a number of control channels to monitor, the at least one processor further configured to:
monitor the number of control channels to receive the one or more DCI from the one or more TRPs.

14. The receiving device of claim 8, wherein the configuration message further indicates the scheduling threshold duration.

15. A method of wireless communication at a receiving device, comprising:
receiving a configuration message from a scheduling entity, the configuration message configuring an initial transmission configuration indication (TCI) state indicating one or more sets of quasi co-location (QCL) parameters for receiving data;
determining whether a state of the receiving device is within a scheduling threshold duration for decoding downlink control information (DCI);
determining a TCI state to be the initial TCI state if the state of the receiving device is within the scheduling threshold duration; and
receiving the data from one or more transmission points (TRPs) based on the one or more sets of QCL parameters indicated by the initial TCI state,
wherein the configuration message further configures a second transmission configuration indication (TCI) state indicating one or more sets of QCL parameters for receiving one or more downlink control information (DCI), and
wherein the one or more sets of QCL parameters for receiving the data indicated by the initial TCI state is different from the one or more sets of QCL parameters for receiving the one or more DCI indicated by the second TCI state.

16. The method of claim 15, further comprising receiving downlink control information (DCI), the DCI including a scheduling offset period.

17. The method claim 16, wherein if the state of the receiving device is not within the scheduling threshold duration, the method further comprising:
determining whether the scheduling offset period is greater than or equal to the scheduling threshold duration;
determining the TCI state based on a TCI field included in the DCI if the scheduling offset period is greater than or equal to the scheduling threshold duration, wherein the TCI field indicates one or more sets of QCL parameters for receiving the data; and
receiving the data from the one or more TRPs based on the one or more sets of QCL parameters indicated by the TCI field.

18. The method of claim 15, wherein the configuration message further indicates a number of control channels to monitor, the method further comprising:
monitoring the number of control channels to receive the one or more DCI from the one or more TRPs.

19. The method of claim 15, wherein the configuration message further indicates the scheduling threshold duration.

20. A receiving device for wireless communication, comprising:
at least one processor;
a transceiver communicatively coupled to the at least one processor; and
a memory communicatively coupled to the at least one processor, wherein the at least one processor is configured to:
receive a configuration message from a scheduling entity via the transceiver, the configuration message configuring an initial transmission configuration indication (TCI) state indicating one or more sets of quasi co-location (QCL) parameters for receiving data,
determine whether a state of the receiving device is within a scheduling threshold duration for decoding downlink control information (DCI),
determine a TCI state to be the initial TCI state if the state of the receiving device is within the scheduling threshold duration, and
receive the data from one or more transmission points (TRPs) via the transceiver based on the one or more sets of QCL parameters indicated by the initial TCI state,
wherein the configuration message further configures a second transmission configuration indication (TCI) state indicating one or more sets of QCL parameters for receiving one or more downlink control information (DCI), and
wherein the one or more sets of QCL parameters for receiving the data indicated by the initial TCI state is different from the one or more sets of QCL parameters for receiving the one or more DCI indicated by the second TCI state.

21. The receiving device of claim 20, wherein the at least one processor is further configured to receive downlink control information (DCI), the DCI including a scheduling offset period.

22. The receiving device of claim 21, wherein if the state of the receiving device is not within the scheduling threshold duration, the at least one processor is configured to:
determine whether the scheduling offset period is greater than or equal to the scheduling threshold duration;
determine the TCI state based on a TCI field included in the DCI if the scheduling offset period is greater than or equal to the scheduling threshold duration, wherein the TCI field indicates one or more sets of QCL parameters for receiving the data; and
receive the data from the one or more TRPs based on the one or more sets of QCL parameters indicated by the TCI field.

23. The receiving device of claim 20, wherein the configuration message further indicates a number of control channels to monitor, the at least one processor further configured to:
monitor the number of control channels to receive the one or more DCI from the one or more TRPs.

24. The receiving device of claim 20, wherein the configuration message further indicates the scheduling threshold duration.

\* \* \* \* \*